(12) United States Patent
Leonard

(10) Patent No.: US 10,161,470 B2
(45) Date of Patent: Dec. 25, 2018

(54) GAS SPRING AND GAS DAMPER ASSEMBLIES AS WELL AS SUSPENSION SYSTEMS INCLUDING SAME

(71) Applicant: Firestone Industrial Products Company, LLC, Indianapolis, IN (US)

(72) Inventor: Joshua R. Leonard, Noblesville, IN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 0 days.

(21) Appl. No.: 15/309,636

(22) PCT Filed: May 8, 2015

(86) PCT No.: PCT/US2015/029868
§ 371 (c)(1),
(2) Date: Nov. 8, 2016

(87) PCT Pub. No.: WO2015/172010
PCT Pub. Date: Nov. 12, 2015

(65) Prior Publication Data
US 2017/0248187 A1    Aug. 31, 2017

Related U.S. Application Data

(60) Provisional application No. 61/991,448, filed on May 9, 2014.

(51) Int. Cl.
*F16F 9/04* (2006.01)
*B60G 15/06* (2006.01)
(Continued)

(52) U.S. Cl.
CPC ............ *F16F 9/0454* (2013.01); *B60G 15/06* (2013.01); *B60G 15/12* (2013.01); *B60G 17/08* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,934,667 A | * | 6/1990 | Pees | B60G 11/64 188/322.17 |
| 6,234,460 B1 | * | 5/2001 | Arnold | B60G 11/28 267/122 |

(Continued)

FOREIGN PATENT DOCUMENTS

| | | |
|---|---|---|
| CN | 101094784 | 12/2007 |
| CN | 102138023 | 7/2011 |

(Continued)

OTHER PUBLICATIONS

International Search Report for corresponding International Application No. PCT/US2015/029868 dated Jul. 23, 2015.

*Primary Examiner* — Nicole T Verley
(74) *Attorney, Agent, or Firm* — Brian D. McAlhaney; Fay Sharpe LLP

(57) ABSTRACT

A gas spring and gas damper assembly includes a gas spring and a gas damper. The gas spring includes a flexible spring member with opposing end members secured thereto and at least partially defining a spring chamber. The gas damper includes an inner sleeve that is at least partially received within one of the end members and at least partially forms a damping chamber. A damper piston assembly is received within the damping chamber and secured to the other of the end members. An elongated damping passage fluidically connects the damping chamber and the spring chamber. Suspension systems and methods are also included.

20 Claims, 13 Drawing Sheets

(51) Int. Cl.
   *B60G 15/12*  (2006.01)
   *B60G 17/08*  (2006.01)
   *F16F 9/36*   (2006.01)
   *F16F 9/50*   (2006.01)

(52) U.S. Cl.
   CPC ............ *F16F 9/049* (2013.01); *F16F 9/0472* (2013.01); *F16F 9/36* (2013.01); *F16F 9/50* (2013.01); *B60G 2202/152* (2013.01); *B60G 2202/242* (2013.01); *B60G 2202/32* (2013.01); *B60G 2500/10* (2013.01); *F16F 2222/126* (2013.01); *F16F 2224/046* (2013.01); *F16F 2228/066* (2013.01); *F16F 2234/00* (2013.01)

(56) References Cited

U.S. PATENT DOCUMENTS

| | | | | |
|---|---|---|---|---|
| 6,247,683 B1* | 6/2001 | Hayakawa | ........... | B60G 17/002 267/64.11 |
| 6,374,966 B1 | 4/2002 | Lillbacka | | |
| 6,422,543 B1* | 7/2002 | Fejerdy | ........... | B60G 11/28 267/122 |
| 6,682,058 B1* | 1/2004 | Nemeth | ........... | B60G 7/04 267/122 |
| 6,695,294 B2* | 2/2004 | Miller | ........... | B60G 15/08 188/322.18 |
| 7,156,382 B2* | 1/2007 | Lloyd | ........... | B60G 11/28 267/122 |
| 8,641,051 B2* | 2/2014 | Pavuk | ........... | B60G 17/052 188/275 |
| 9,098,951 B2* | 8/2015 | Nieten | ........... | G07C 3/00 |
| 9,140,327 B2* | 9/2015 | Hart | ........... | B60G 11/28 |
| 9,695,901 B2* | 7/2017 | Leonard | ........... | F16F 13/002 |
| 9,709,122 B2* | 7/2017 | Zec | ........... | F16F 9/057 |
| 9,738,131 B2* | 8/2017 | Keeler | ........... | B60G 15/12 |
| 9,809,075 B2* | 11/2017 | Bounds | ........... | B60G 15/14 |
| 2002/0096841 A1* | 7/2002 | Hedenberg | ........... | B60G 11/465 280/6.159 |
| 2006/0208404 A1* | 9/2006 | Cmich | ........... | B60G 11/28 267/64.27 |
| 2006/0226586 A1* | 10/2006 | Levy | ........... | B60G 11/28 267/64.27 |
| 2007/0114706 A1* | 5/2007 | Myers | ........... | B60G 11/28 267/64.27 |
| 2007/0290461 A1* | 12/2007 | Oscarsson | ........... | B60G 11/28 280/6.15 |
| 2008/0211150 A1* | 9/2008 | Levy | ........... | B60G 11/28 267/64.27 |
| 2008/0246198 A1* | 10/2008 | Levy | ........... | B60G 11/28 267/124 |
| 2009/0057967 A1* | 3/2009 | Koeske | ........... | B60G 11/27 267/118 |
| 2010/0253018 A1* | 10/2010 | Peterson | ........... | B60G 17/0155 280/5.504 |
| 2011/0115140 A1 | 5/2011 | Moulik | | |
| 2011/0140324 A1* | 6/2011 | Naber | ........... | B60G 15/12 267/140.13 |
| 2013/0193664 A1* | 8/2013 | Egolf | ........... | B60G 11/22 280/124.157 |
| 2014/0070468 A1 | 3/2014 | Leonard | | |
| 2014/0246817 A1 | 9/2014 | Bounds | | |
| 2014/0251742 A1* | 9/2014 | Dillman | ........... | F16F 9/49 188/313 |
| 2015/0008627 A1* | 1/2015 | Leonard | ........... | F16F 7/09 267/64.24 |
| 2015/0217617 A1* | 8/2015 | Leonard | ........... | B60G 11/62 280/124.16 |
| 2015/0273968 A1* | 10/2015 | DeBruler | ........... | F16F 13/002 267/64.24 |
| 2016/0101663 A1* | 4/2016 | Leonard | ........... | F16F 9/0472 267/64.24 |
| 2016/0121682 A1* | 5/2016 | Leonard | ........... | F16F 9/049 280/124.161 |
| 2016/0280033 A1* | 9/2016 | Fulton | ........... | B60G 15/12 |
| 2017/0151848 A1* | 6/2017 | Delorenzis | ........... | B60G 15/12 |
| 2017/0241504 A1* | 8/2017 | Delorenzis | ........... | B60G 9/003 |

FOREIGN PATENT DOCUMENTS

| | | |
|---|---|---|
| SU | 149175 | 11/1961 |
| SU | 1650978 | 5/1991 |
| WO | WO 2013/181241 | 12/2013 |
| WO | WO 2014/036541 | 3/2014 |

\* cited by examiner

GAS SPRING AND GAS DAMPER ASSEMBLIES AS WELL AS SUSPENSION SYSTEMS INCLUDING SAME

This application claims priority from U.S. Provisional Patent Application No. 61/991,448, filed on May 9, 2014, the contents of which is hereby incorporated herein by reference in its entirety.

BACKGROUND

The subject matter of the present disclosure broadly relates to the art of gas spring devices and, more particularly, to gas spring and gas damper assemblies that include a damping chamber with a damper piston disposed therein for reciprocal movement and separating the damping chamber into first and second damping chamber portions with one or more elongated passages in fluid communication therewith that are capable of providing pressurized gas damping. Suspension systems including one or more of such gas spring and gas damper assemblies as well as methods of manufacture are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and gas damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Pat. No. 7,213,799. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies relates to the additional volumes of pressurized gas that are utilized by some designs. Certain difficulties relating to the incorporation of such additional volumes of pressurized gas in proximal association with the corresponding gas spring and gas damper assembly. As one example, motorized vehicles commonly include significant packaging and/or space limitations that can reduce the volume that is available adjacent the gas spring and gas damper assembly for storing pressurized gas. As such, in some cases, a reduced volume of pressurized gas may be used. In other cases, the desired volume of pressurized gas may be provided in a remote location relative to the gas spring and gas damper assembly. In either case, some decrease in damping performance may result.

Accordingly, it is desired to develop gas spring and gas damper assemblies as well as a suspension system including one or more of such assemblies that overcome the foregoing and/or other difficulties associated with known constructions, and/or which may otherwise advance the art of gas spring and gas damper assemblies.

BRIEF DESCRIPTION

One example of a gas spring and gas damper assembly in accordance with the subject matter of the present disclosure can include a gas spring and a gas damper. The gas spring can include a flexible spring member having a longitudinal axis. The flexible spring member can include a flexible wall extending longitudinally between first and second ends and peripherally about the axis to at least partially define a spring chamber. A first end member can be secured across the first end of the flexible spring member such that a substantially fluid-tight seal is formed therebetween. A second end member can be disposed in spaced relation to the first end member. The second end member can be secured across the second end of the flexible spring member such that a substantially fluid-tight seal is formed therebetween. The second end member can include an end member wall having an outside surface dimensioned for abutting engagement with the flexible wall of the flexible spring member. The end member wall can also include an inside surface that can at least partially define an end member cavity. The gas damper can include an inner sleeve that can extend longitudinally between opposing sleeve ends. The inner sleeve can include a sleeve wall with an inner surface and an outer surface. The inner sleeve can be at least partially received within the end member cavity such that the outer surface of the sleeve wall is disposed in facing relation to the inside surface of the end member wall. The inner surface of the sleeve wall can at least partially define a damping chamber. A damper piston assembly can include a damper piston and an elongated damper rod that is operatively connected to the damper piston. The damper piston can be positioned within the damping chamber and can include an outer side wall disposed adjacent the inner surface of the inner sleeve. The damper piston can separate the piston chamber into first and second chamber portions. At least one of the first and second chamber portions can be disposed in fluid communication with the spring chamber through one or more elongated damping passages that are capable of providing pressurized gas damping. The damper rod can be operatively connected to the first end member such that upon extension and compression of the gas spring and gas damper assembly, the damper piston is reciprocally displaced within the damping chamber.

One example of a suspension system in accordance with the subject matter of the present disclosure can include a pressurized gas system that includes a pressurized gas source and a control device. The suspension system can also include at least one gas spring and gas damper assembly according to the foregoing paragraph. The at least one gas spring and gas damper assembly can be disposed in fluid communication with the pressurized gas source through the control device such that pressurized gas can be selectively transferred into and out of the spring chamber.

One example of a method of manufacturing a gas spring and gas damper assembly in accordance with the subject matter of the present disclosure can include providing a flexible spring member having a longitudinal axis. The flexible spring member can include a flexible wall extending longitudinally between first and second ends and peripherally about the axis to at least partially define a spring chamber. The method can also include providing a first end member and securing the first end member across the first end of the flexible spring member such that a substantially fluid-tight seal is formed therebetween. The method can further include providing a second end member. The second end member can include an end member wall having an outside surface that is dimensioned for abutting engagement with the flexible wall of the flexible spring member. The end member wall can also include an inside surface that at least partially defines an end member cavity with at least one open end. The method can also include securing the second end member across the second end of the flexible spring member such that a substantially fluid-tight seal is formed therebetween. The method can further include providing an inner sleeve that can extend longitudinally between opposing sleeve ends. The inner sleeve can include a sleeve wall with an inner surface and an outer surface. The inner surface of the sleeve wall can at least partially define a damping chamber. The method can still further include positioning the inner sleeve at least partially within the end member cavity such that the outer surface of the sleeve wall is disposed in facing relation to the inside surface of the end member wall. The method can also include providing a damper piston assembly that can include a damper piston and an elongated damper rod that is operatively connected to the damper piston. The damper piston can include an outer side wall. The method can further include positioning the damper piston within the damping chamber such that the outer side wall is disposed adjacent the inner surface of the inner sleeve. The damper piston can separate the piston chamber into first and second chamber portions. The method can also include connecting at least one of the first and second chamber portions in fluid communication with the spring chamber through one or more elongated passages that are capable of providing pressurized gas damping. And, the method can include connecting the damper rod to the first end member such that upon extension and compression of the gas spring and gas damper assembly, the damper piston is reciprocally displaced within the damping chamber.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
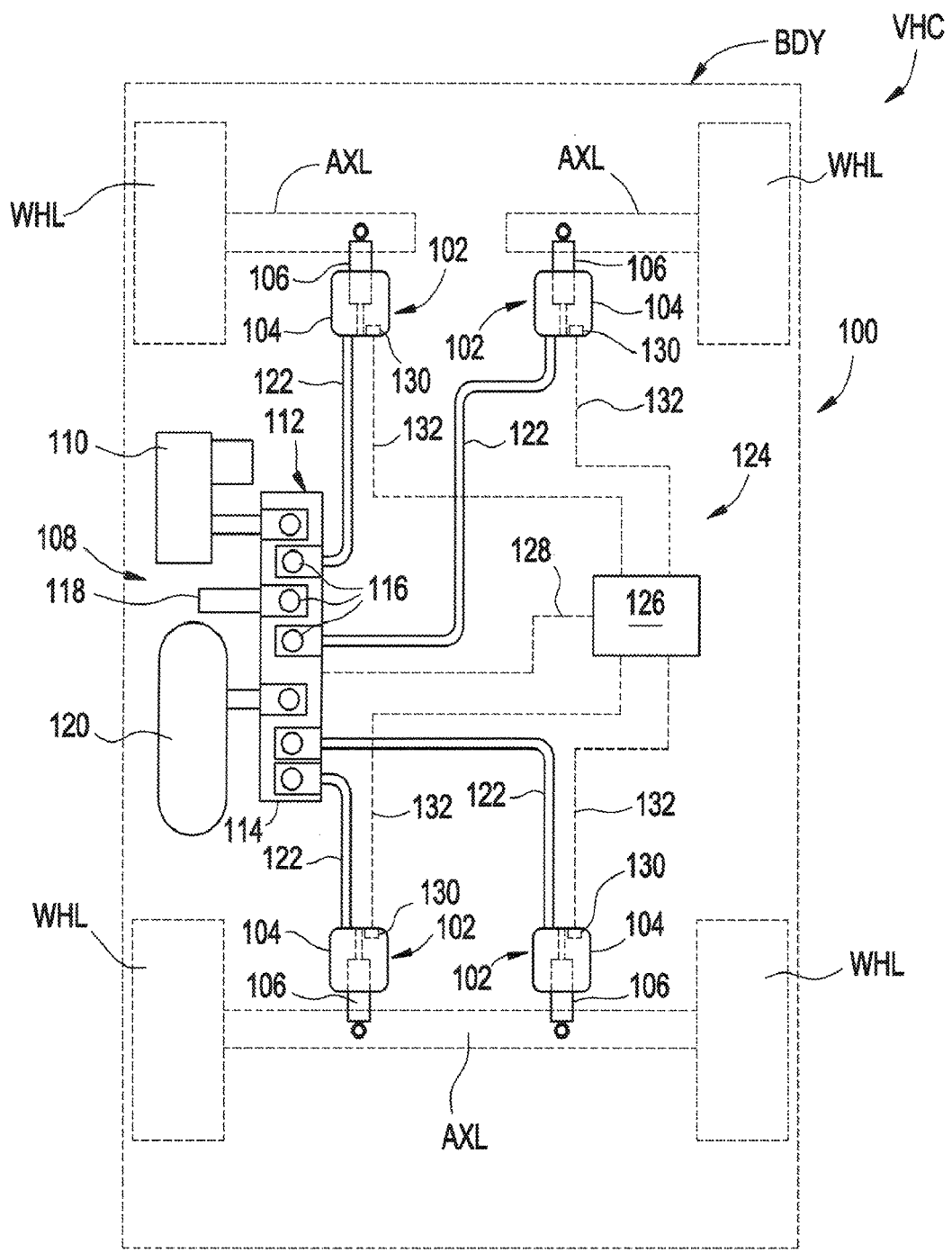
FIG. 1 is a schematic representation of one example of a suspension system of an associated vehicle that includes one or more gas spring and gas damper assemblies in accordance with the subject matter of the present disclosure.
Figure 2:
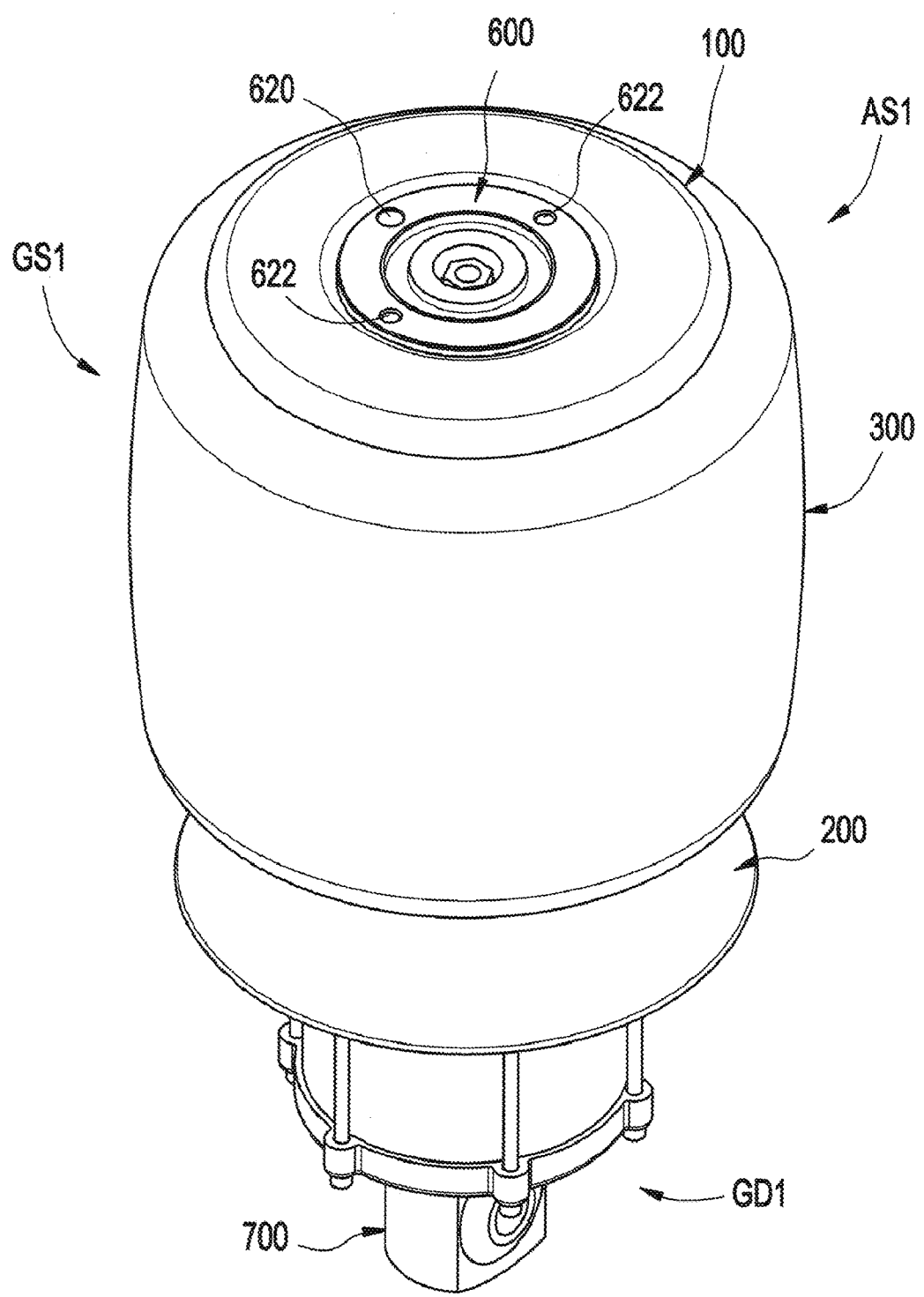
FIG. 2 is a top perspective view of one example of a gas spring and gas damper assembly in accordance with the subject matter of the present disclosure.
Figure 3:
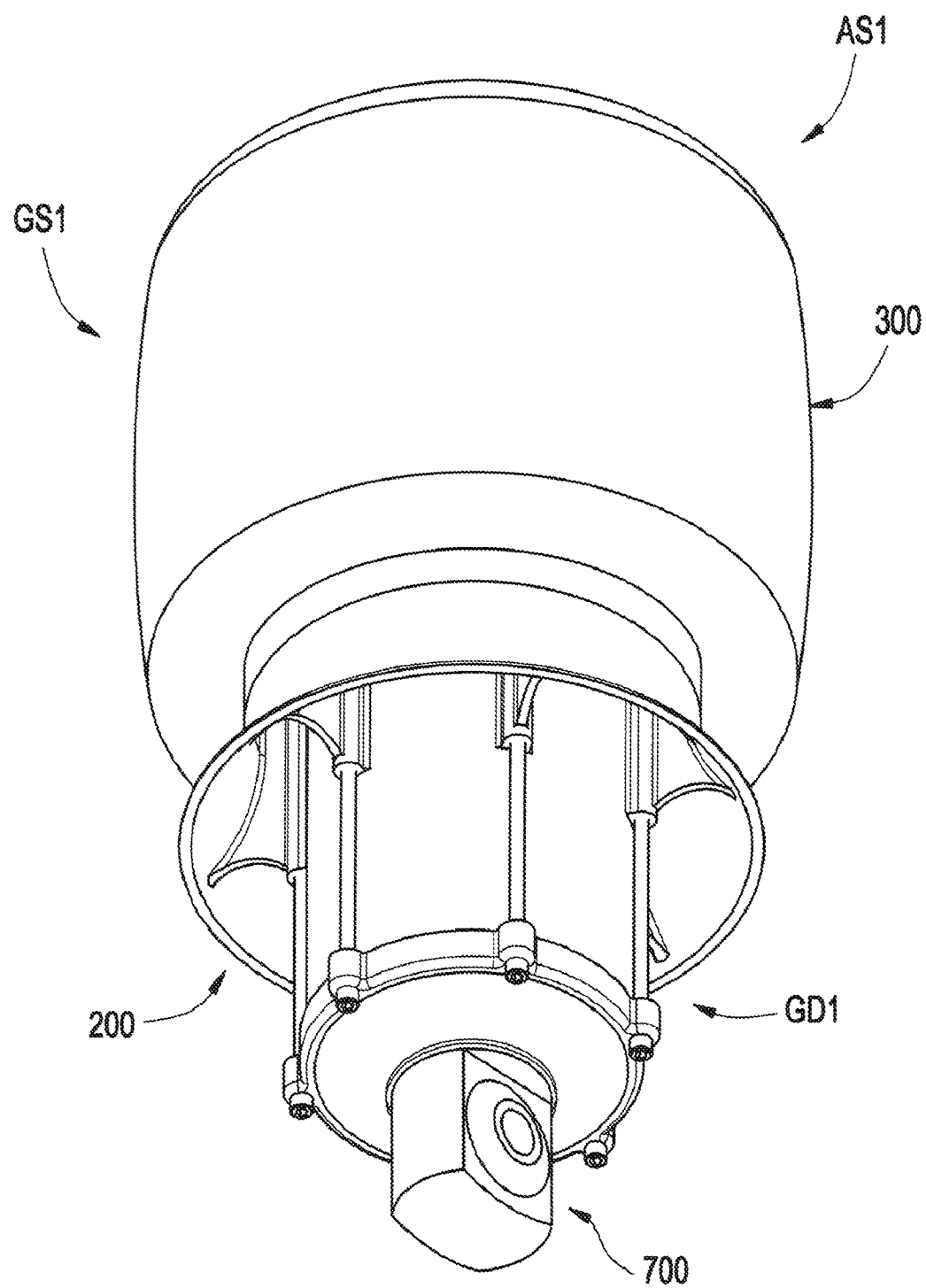
FIG. 3 is a bottom perspective view of the exemplary gas spring and gas damper assembly in FIG. 2.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and gas damper assemblies 102 that are operatively connected between the sprung and unsprung masses of the vehicle. Depending on desired performance characteristics and/or other factors, the suspension system may, in some cases, also include damping members (not shown) of a typical construction that are provided separately from assemblies 102 and secured between the sprung and unsprung masses in a conventional manner. In a preferred arrangement, however, gas spring and gas damper assemblies 102 will be sized, configured and operative to provide the desired performance characteristics for the suspension system without the use of additional damping members (e.g., conventional struts or shock absorbers) that are separately provided.

In the arrangement shown in FIG. 1, suspension system 100 includes four gas spring and gas damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement. As shown in FIG. 1, gas spring and gas damper assemblies 102 are supported between axles AXL and body BDY of associated vehicle VHC, and include a gas spring 104 and a gas damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and gas damper assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 and/or gas dampers 106 of assemblies 102 through suitable gas transfer lines 122. As such, pressurized gas can be selectively transferred into and/or out of the gas springs and/or the gas dampers through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Figure 4:
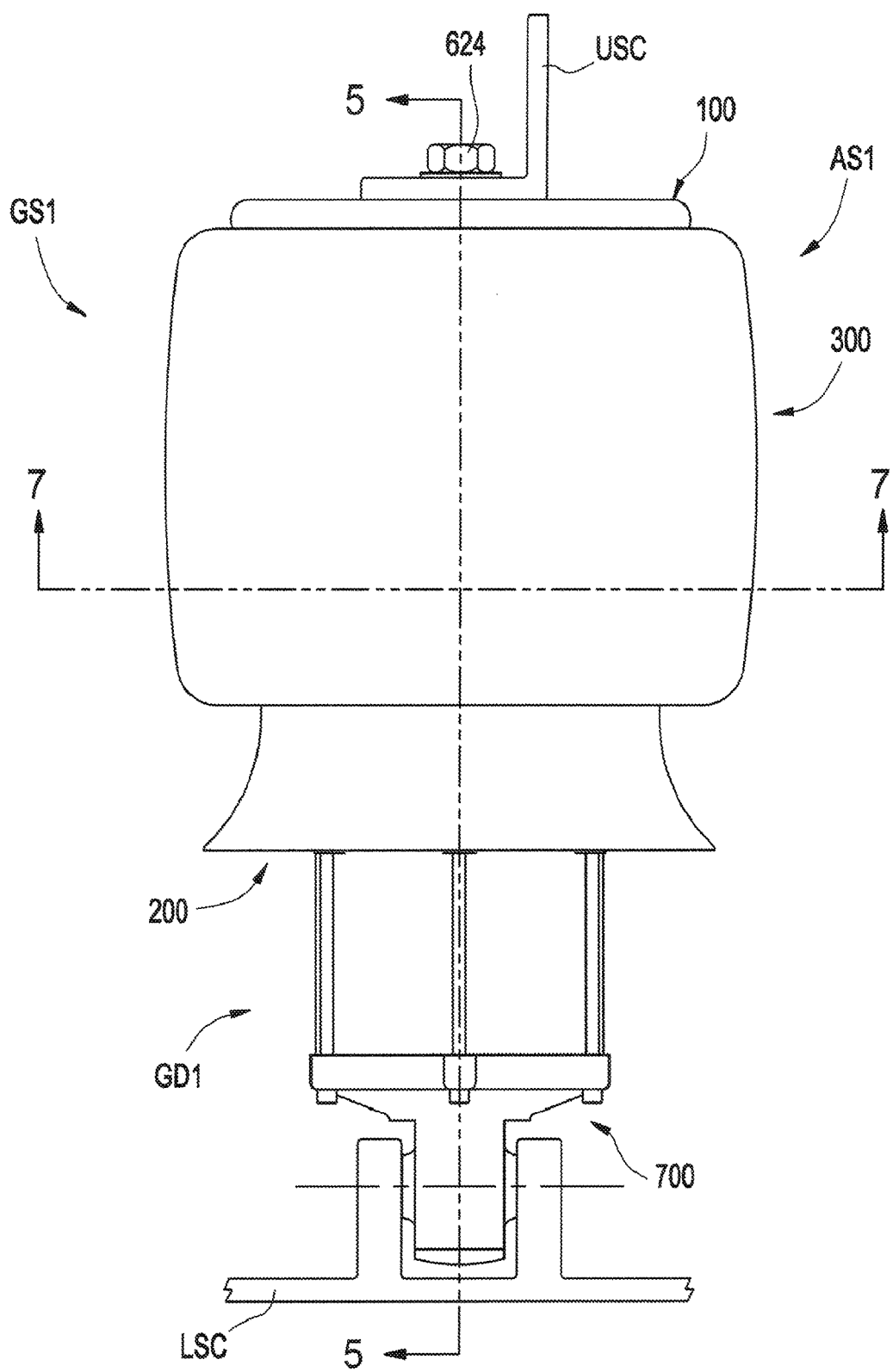
FIG. 4 is a side elevation view of the gas spring and gas damper assembly in FIGS. 2 and 3.
Figure 5:
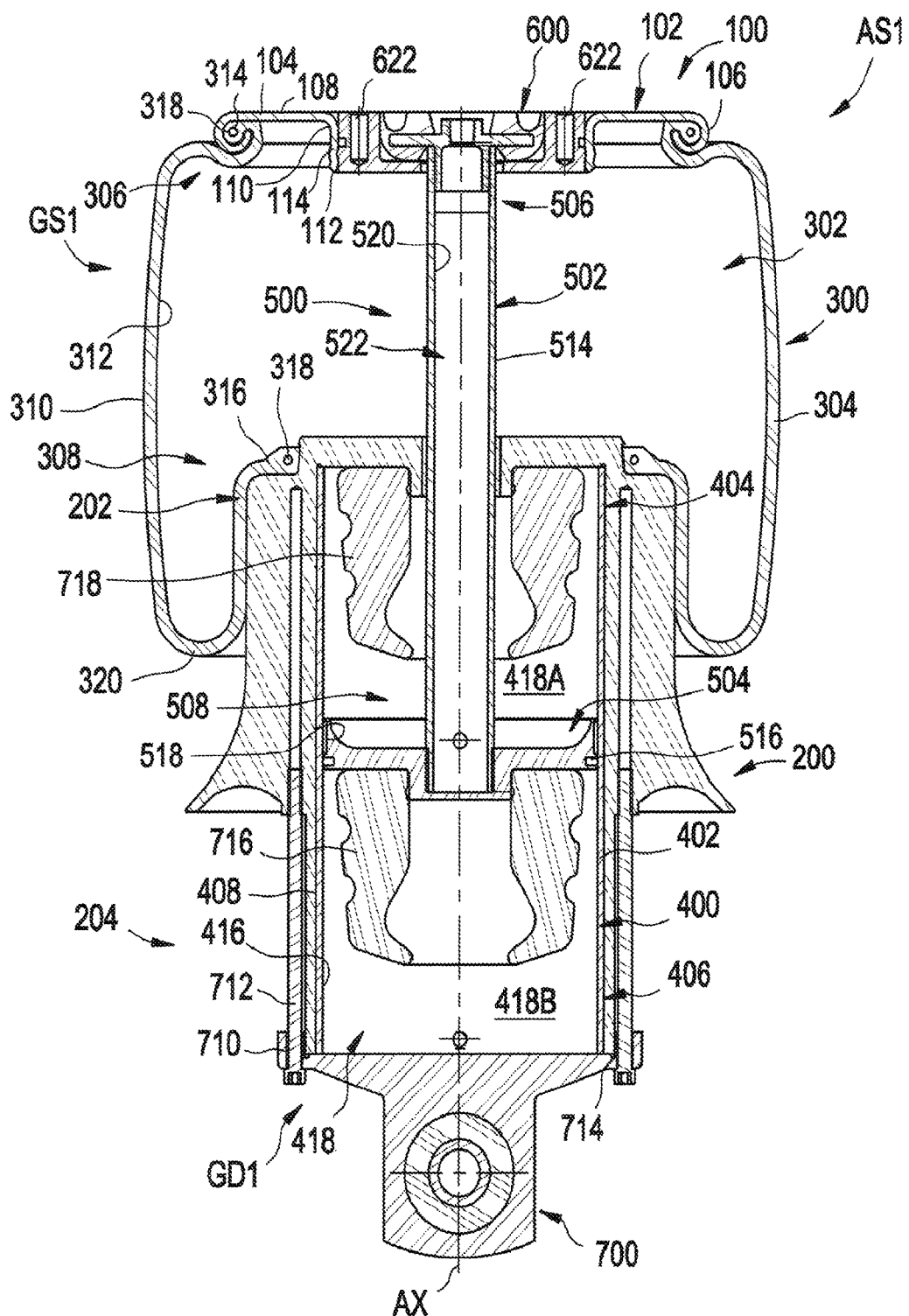
FIG. 5 is a cross-sectional side view of the gas spring and gas damper assembly in FIGS. 2-4 taken from along line 5-5 in FIG. 4.
Figure 6:
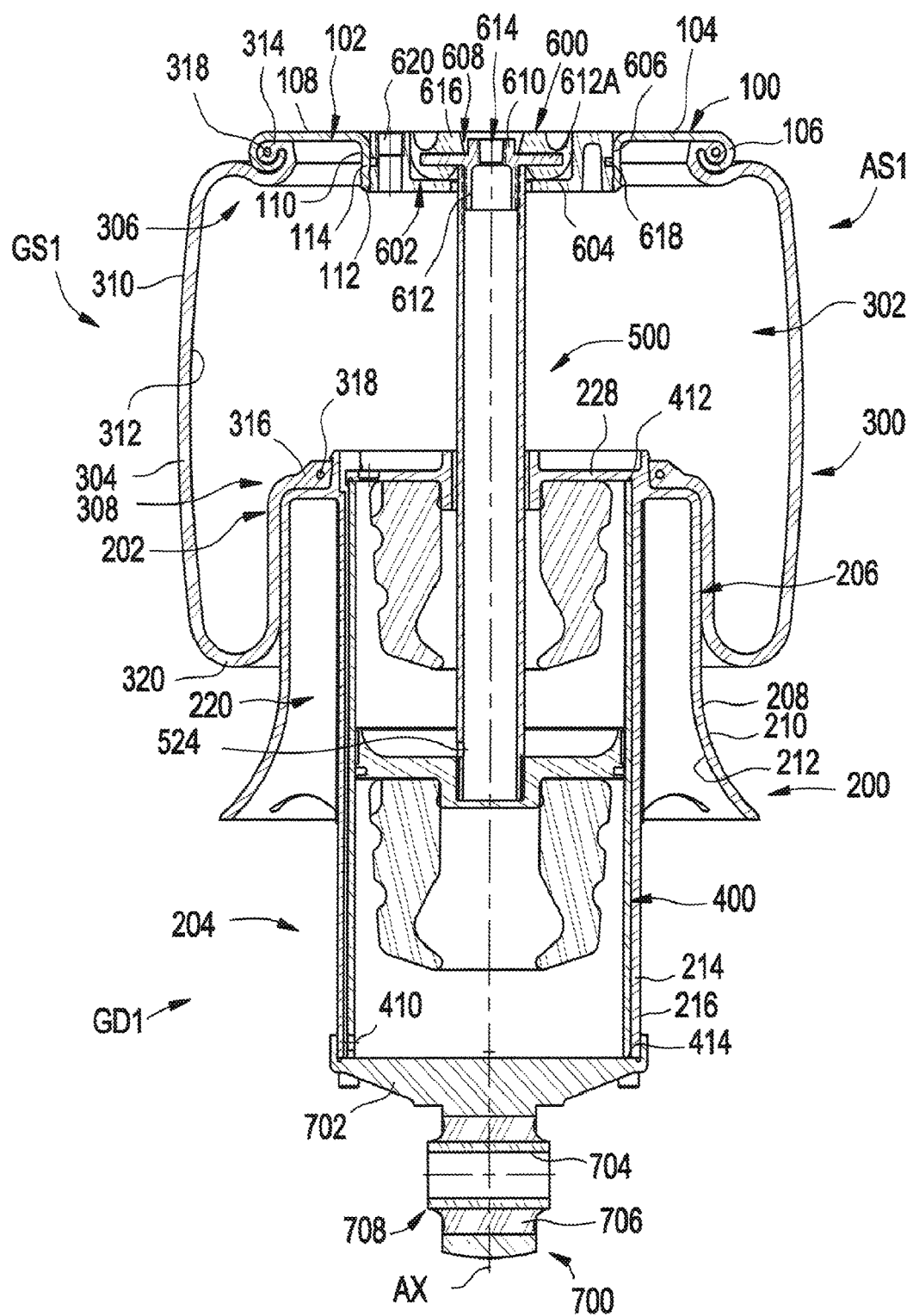
FIG. 6 is a cross-sectional side view of the gas spring and gas damper assembly in FIGS. 2-5 taken perpendicular to the view in FIG. 5.
Figure 7:
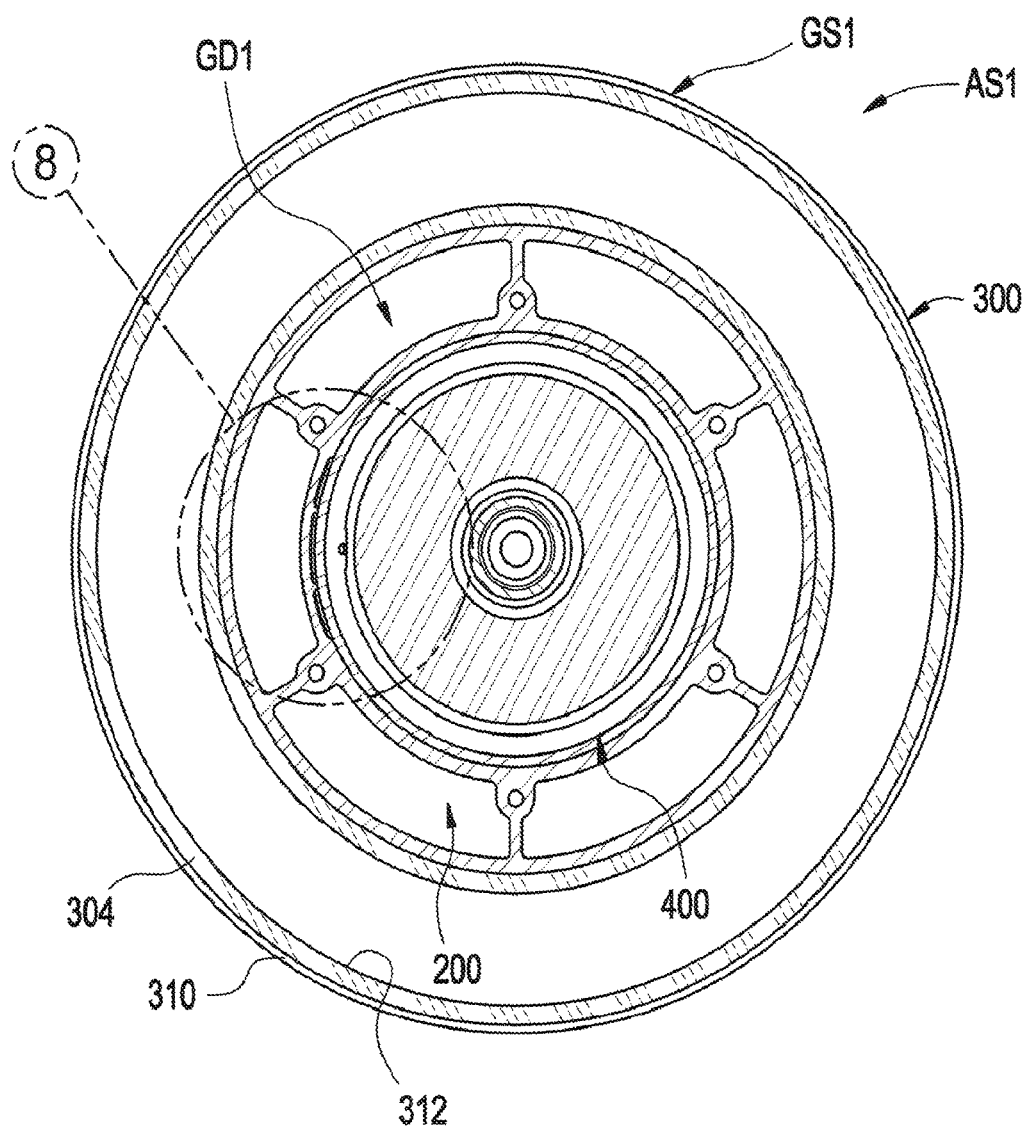
FIG. 7 is a cross-sectional plan view of the gas spring and gas damper assembly in FIGS. 2-6 taken from along line 7-7 in FIG. 4.
Figure 8:
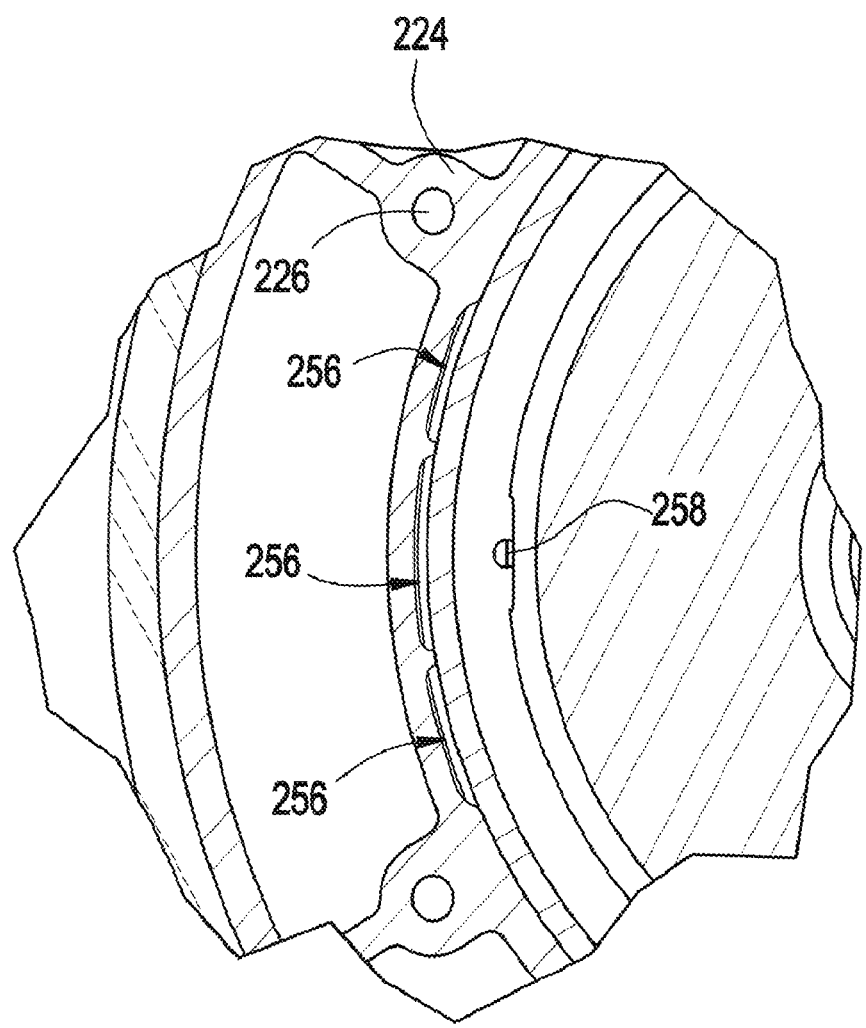
FIG. 8 is a greatly enlarged portion of the gas spring and gas damper in FIGS. 2-7 identified as Detail 8 in FIG. 7.
Figure 9:
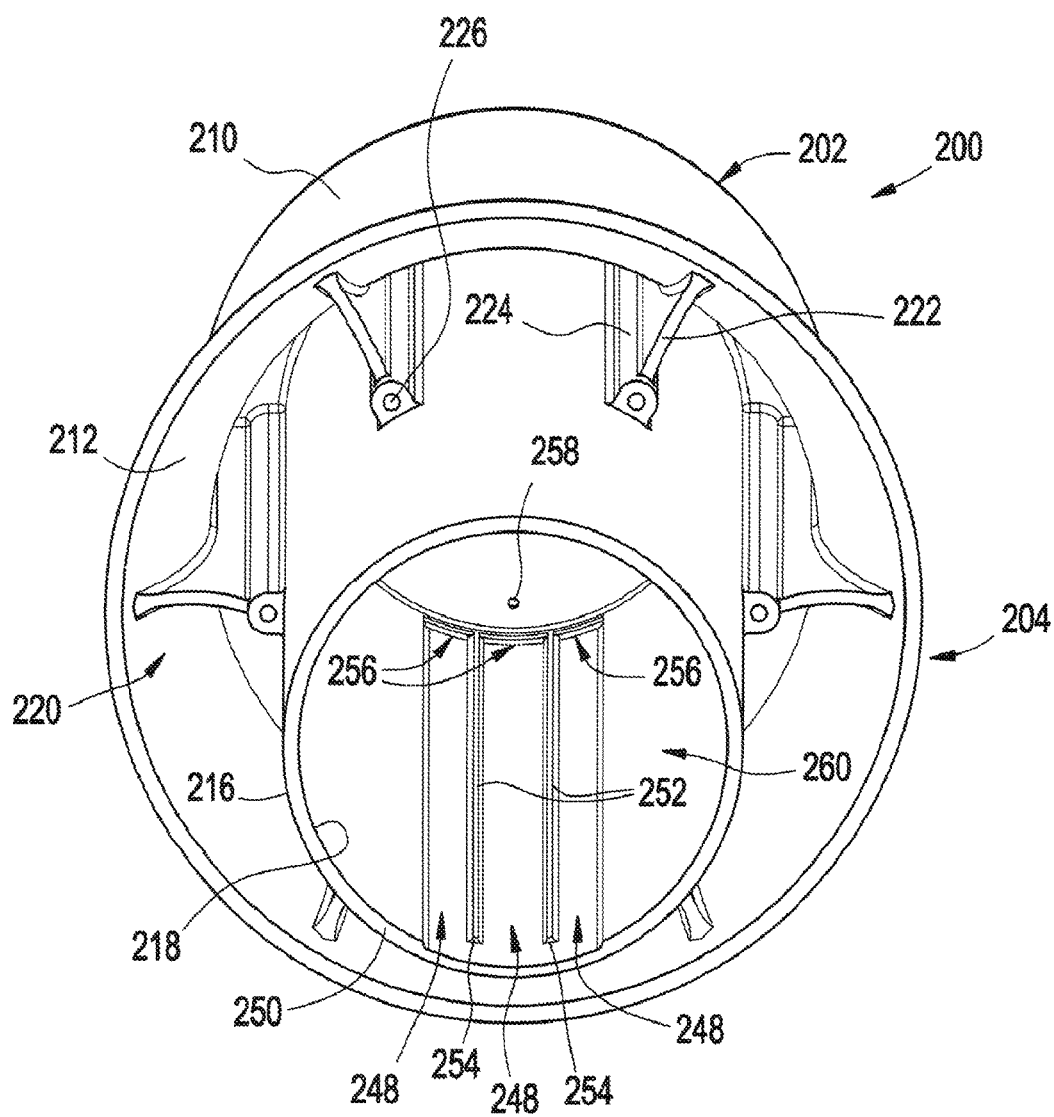
FIG. 9 is a bottom perspective view of the gas spring end member shown in FIGS. 2-8.
Figure 10:
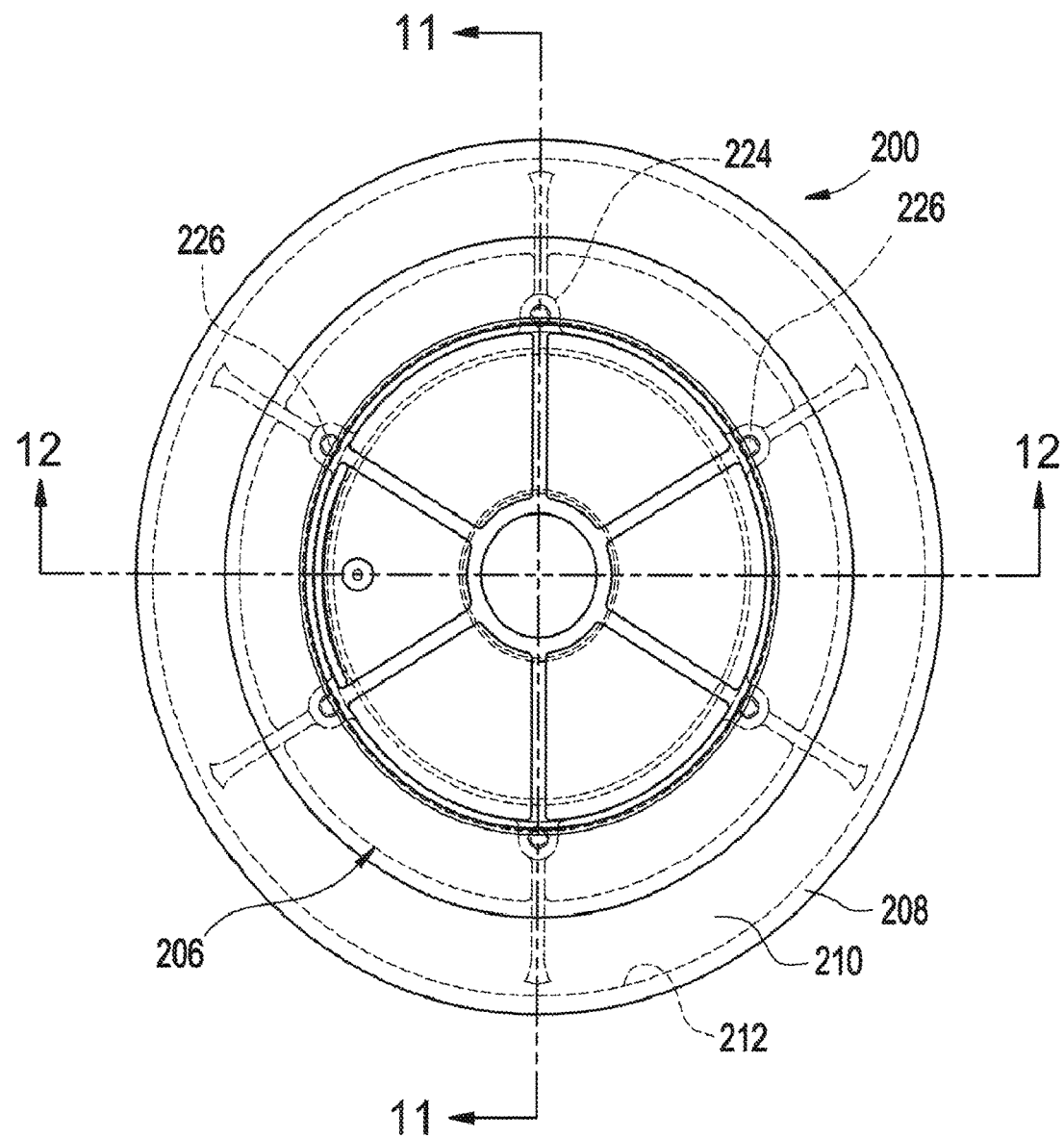
FIG. 10 is a top plan view of the gas spring end member in FIG. 9.
Figure 11:
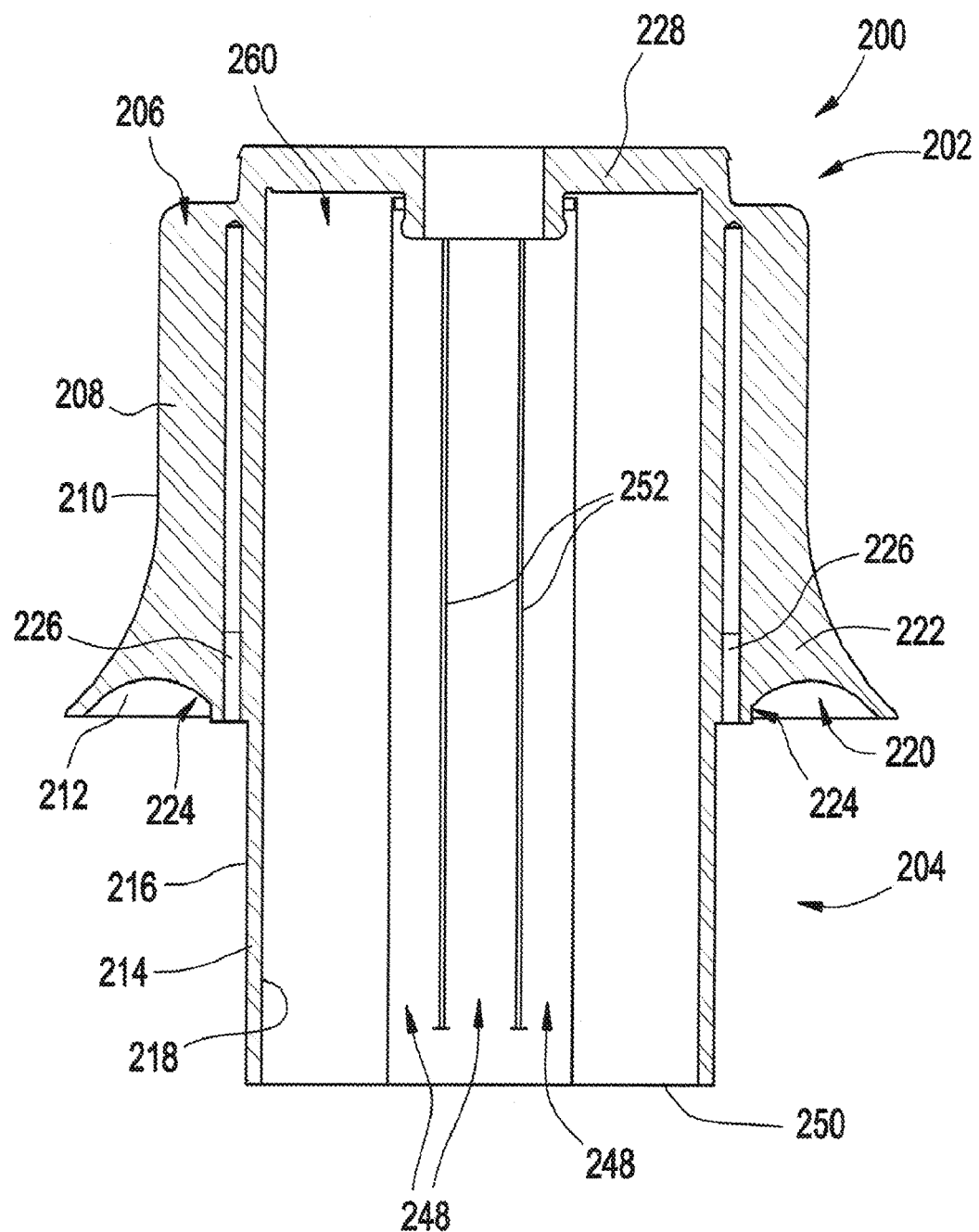
FIG. 11 is a cross-sectional side view of the gas spring end member in FIGS. 9 and 10 taken from along line 11-11 in FIG. 10.
Figure 12:
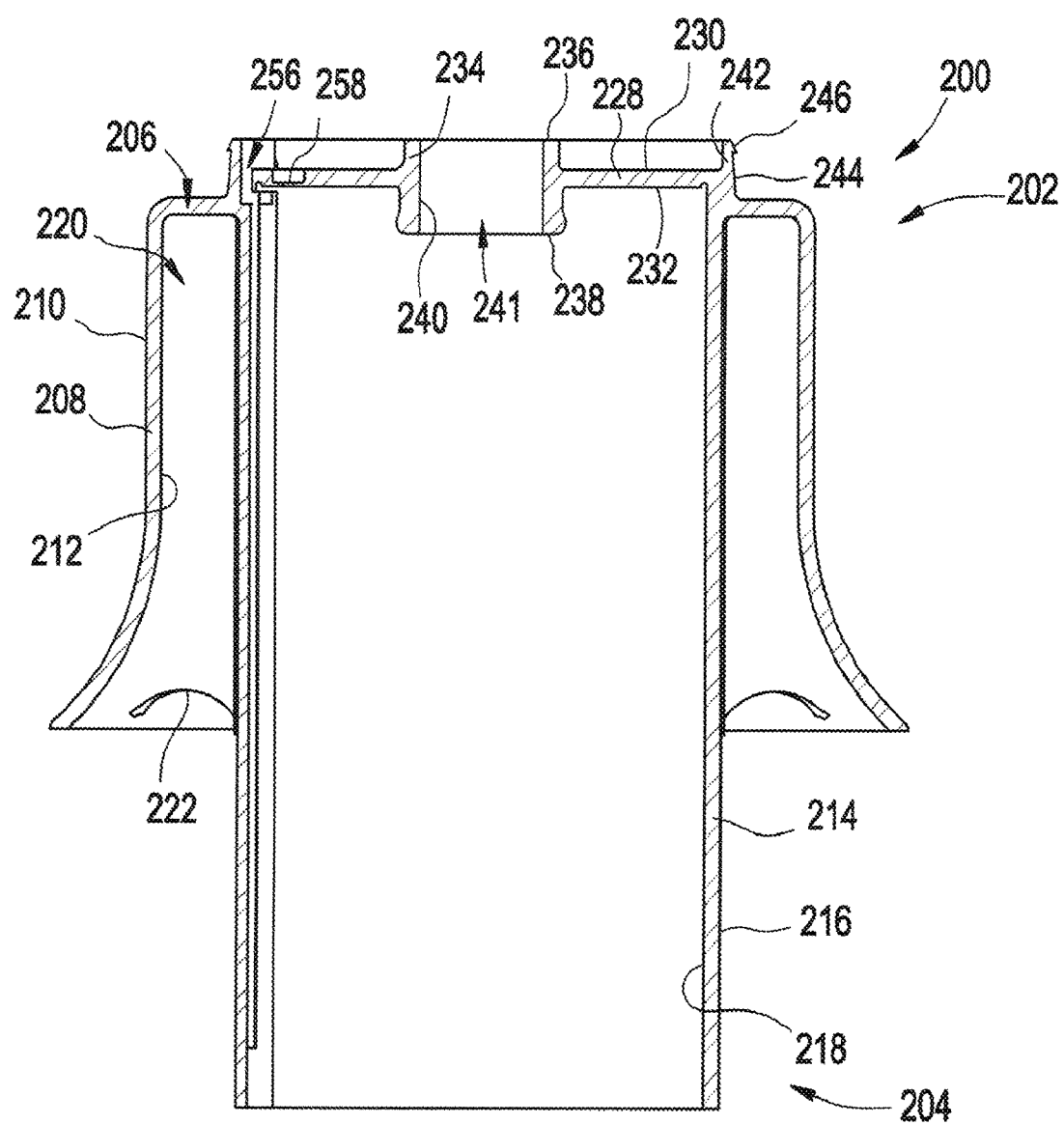
FIG. 12 is a cross-sectional side view of the gas spring end member in FIGS. 9-11 taken from along line 12-12 in FIG. 10.

Having described an example of a suspension system (e.g., suspension system 100) that can include gas spring and gas damper assemblies in accordance with the subject matter of the present disclosure, one example of such a gas spring and gas damper assembly will now be described in connection with FIGS. 2-8. As shown therein, one example of a gas spring and gas damper assembly AS1, such as may be suitable for use as one or more of gas spring and gas damper assemblies 102 in FIG. 1, for example, is shown as including a gas spring (or gas spring assembly) GS1 and a gas damper (or gas damper assembly) GD1. Gas spring assembly GS1 and gas damper assembly GD1 can be operatively secured to one another and fluidically coupled with one another in any suitable manner, such as is described hereinafter, for example. A longitudinal axis AX extends lengthwise along assembly AS1, as shown in FIGS. 5 and 6.

Gas spring assembly GS1 can include an end member 100 and an end member 200 that is spaced axially from end member 100. A flexible spring member 300 can extend peripherally around axis AX and can be secured between the end members in a substantially fluid-tight manner such that a spring chamber 302 is at least partially defined therebetween. Gas damper assembly GD1 can include an inner sleeve 400 that is operatively supported on or along end member 200 and a damper rod assembly 500 that is operatively associated with inner sleeve 400. An end mount 600 can operatively connect damper rod assembly 500 with end member 100. A base mount 700 can be operatively connected with one or more of end member 200 and inner sleeve 400.

Gas spring and gas damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 4, for example, end member 100 can be secured along a first or upper structural component USC, such as associated vehicle body BDY in FIG. 1, for example, and can be secured thereon in any suitable manner. Additionally, base mount 700 can be secured on or along a second or lower structural component LSC, such as one of associated axles AXL in FIG. 1, for example.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 2-8 as including a flexible wall 304 that can be formed in any suitable manner and from any suitable material or combination of materials. For example the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 100 and/or end member 200. As one example, flexible spring member 300 can include a mounting bead 314 disposed along end 306 of flexible wall 304 and a mounting bead 316 disposed along end 308 of the flexible wall. In some cases, the mounting bead, if provided, can, optionally, include a reinforcing element, such as an endless, annular bead wire 318, for example.

It will be appreciated that the end members can be of any suitable type, kind, construction and/or configuration, and can be operatively connected or otherwise secured to the flexible spring member in any suitable manner. In the exemplary arrangement shown in FIGS. 2-8, for example, end member 100 is of a type commonly referred to as a bead plate and includes an end member wall 102 with an intermediate wall portion 104 and an outer peripheral wall portion 106. End member 100 is disposed along end 306 of flexible wall 304 with outer peripheral wall portion 106 crimped or otherwise deformed around at least a portion of mounting bead 314 such that a substantially fluid-tight seal can be formed between flexible spring member 300 and end member 100. Intermediate wall portion 104 can have an approximately planar outer surface 108 dimensioned to abuttingly engage an associated structural component (e.g., upper structural component USC).

End member 100 can also include a mounting wall portion 110 disposed radially inward from intermediate wall portion 104. Mounting wall portion 110 can project axially from along intermediate wall portion 104 toward a distal edge 112. Mounting wall portion 110 can at least partially define a passage or opening (not numbered) extending through end member 100. In some cases, one or more engagement features can be formed on or along mounting wall portion 110. It will be appreciated that any such one or more engagement features, if provided, can be of any suitable type, kind and/or configuration. For example, end member 100 is shown in FIGS. 5 and 6 as including an endless, annular groove 114 extending into mounting wall portion 110 adjacent distal edge 112. It will be appreciated, however, that other configurations and/or arrangements could alternately be used, such as an endless, annular ridge, or one or more ridge and/or groove segments, for example.

End member 200 is shown as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member 200, for example. As such, it will be appreciated that the walls and/or wall portions of the end member can be of any suitable shape, profile and/or configuration, such as may be useful to provide one or more desired performance characteristics, for example, and that the profile shown in FIGS. 2-12 is merely exemplary.

End member 200 can extend lengthwise between opposing ends 202 and 204 that are axially spaced from one another. End member 200 can include an end member wall 206 that can have a first or outer side wall portion 208 that extends in a generally axial direction and includes an outside surface 210 and an inside surface 212. End member 200 can also include a second or inner side wall portion 214 that also extends in a generally axial direction. Inner side wall portion 214 is spaced radially inward from outer side wall portion 208 and includes an outside surface 216 and an inside surface 218.

In the arrangement shown in FIGS. 2-12, end member 200 includes a cavity 220 extending into the end member between inside surface 212 of outer side wall portion 208 and outside surface 216 of inner side wall portion 214. In some cases, one or more support wall portions 222 can extend between and operatively interconnect the outer and inner side wall portions. Additionally, in some cases, one or more bosses or projections can be provided on or along the end member wall, such as may be suitable for including one or more securement devices and/or securement features. In the exemplary arrangement shown in FIGS. 2-12, for example, end member wall 206 can include projections 224 that extend radially outward from along inner side wall portion 214 and axially along the inner side wall portion. Securement features 226, such as threaded passages, for example, can extend axially into projections 224. It will be appreciated, however, that other configurations and/or arrangements could alternately be used.

In some cases, an end wall portion 228 can extend across and/or between one or more of outer side wall portion 208 and inner side wall portion 214. If provided, end wall portion 228 can be oriented transverse to axis AX and can include opposing surfaces 230 and 232. Additionally, in some cases, end member wall 206 can include an inner support wall portion 234 that can be disposed radially inward from inner side wall portion 214. Inner support wall portion 234 can project axially from along end wall portion 228 and include one or more distal edges 236 and 238. Additionally, inner support wall portion 234 can include an inside surface 240 that can at least partially define a passage 241 (FIG. 12) extending through end wall portion 228.

As indicated above, it will be appreciated that the one or more end members of the gas spring and gas damper assembly can be operatively connected or otherwise secured to the flexible spring member in any suitable manner. For example, end member wall 206 can include an inner mounting wall portion 242 that extends axially beyond end wall portion 228 and extends peripherally about axis AX. Inner mounting wall portion 242 can have an outer surface 244 that is dimensioned to receive mounting bead 316 disposed along end 308 of the flexible wall 304 such that a substantially fluid-tight seal can be formed therebetween. In some cases, a retaining ridge 246 can project radially outward from along the inner mounting wall portion 242 and can extend peripherally along at least a portion thereof, such as may assist in retaining end 308 of flexible wall 304 in abutting engagement on or along the end member.

In an assembled condition, outer surface 310 of flexible wall 304 can be disposed in abutting engagement with outside surface 210 of outer side wall portion 208. In such an arrangement, flexible wall 304 of flexible spring member 300 can form a rolling lobe 320 along the outside surface of outer side wall portion 208. As gas spring and gas damper assembly AS1 is displaced between compressed and extended conditions, rolling lobe 320 can be displaced along outer surface 210 in a generally conventional manner.

As mentioned above, a gas spring and gas damper assembly in accordance with the subject matter of the present disclosure can include one or more elongated gas damping passages through which pressurized gas can flow to generate pressurized gas damping to dissipate kinetic energy acting on the gas spring and gas damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

As indicated above, a gas spring and gas damper assembly in accordance with the subject matter of the present disclosure can include one or more elongated gas damping passages fluidically connected between the spring chamber and one or more damping chambers or damping chamber portions. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

As discussed above, a gas spring and gas damper assembly in accordance with the subject matter of the present disclosure can include one or more elongated gas damping passages in fluid communication between the spring chamber and one or more damping chambers or damping chamber portions. Differential pressure between the volumes can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

One or more elongated channels extend radially outward into inner side wall portion 214 from along inside surface 218. In the arrangement shown in FIGS. 2-12, for example, a plurality of elongated channels 248 extend axially along the inner side wall portion from along an edge 250 thereof toward end wall portion 228. It will be appreciated that intermediate wall portions 252 separate elongated channels 248 from one another. Additionally, it will be recognized that intermediate wall portions 252 extend from ends 254 toward end wall portion 228 with ends 254 spaced axially away from edge 250 of inner side wall portion 214. In this manner, pressurized gas flowing into or out of a given port or orifice can be distributed to each of the elongated channels. In some cases, intermediate wall portions 252 can extend into abutting engagement with end wall portion 228. In such case, a plurality of openings or passages 256 can be provided in fluid communication with elongated channels 248 that extend through end wall portion 228 or another feature of end member wall 206. It will be appreciated, however, that any suitable number of openings or passages could be used, and that any such one or more passages can take any suitable size, shape, configuration and/or arrangement. Additionally, in some cases, one or more passages 258 can extend through end wall portion 228 such as to permit fluid communication therethrough. One or more control devices, such as one or more valves, for example, can optionally be included on or along any such passages to selectively permit pressurized gas flow therethrough. Additionally, it will be appreciated that inside surface 218 of inner side wall portion 214 together with surface 232 of end wall portion 228 at least partially defines an end member cavity 260 extending into end member 200 with an open end adjacent or otherwise along edge 250.

With reference, now, to gas damper assembly GD1, inner sleeve 400 thereof can include a sleeve wall 402 that extends axially between opposing ends 404 and 406. Sleeve wall 402 can extend peripherally about axis AX and can, in some case, have an approximately uniform wall thickness. Additionally, in some cases, sleeve wall can have an approximately circular cross-sectional profile such that the inner sleeve is approximately cylindrical in overall shape. It will be appreciated, however, that other configurations and/or arrangements could alternately be used. Additionally, sleeve wall 402 forms an outer surface 408 along the inner sleeve. In a preferred arrangement, sleeve wall 402 is dimensioned to be received within end member cavity 260 of end member 200 with outer surface 408 disposed in facing relation to inside surface 218 of inner side wall portion 214. In such case, a plurality of elongated gas damping passages can be formed by elongated channels 248 together with outer surface 408 of the inner sleeve. In some cases, one or more orifices or ports 410 can extend through sleeve wall 402. In a preferred arrangement, ports 410 can be disposed adjacent ends 254 of intermediate wall portions 252 such that pressurized gas flow through the ports can flow into and/or out of the elongated gas damping passages.

In an assembled condition, inner sleeve 400 is disposed within end member cavity 260 of end member 200 with an edge 412 disposed in abutting engagement with end wall portion 228 and an opposing edge 414 disposed adjacent edge 250 of inner side wall portion 214. Additionally, sleeve wall 402 forms an inner surface 416 within inner sleeve 400 that can at least partially define a damping chamber 418 within end member 200.

Damper rod assembly 500 includes an elongated damper rod 502 and a damper piston 504. Damper rod 502 extends longitudinally from an end 506 to an end 508. End 506 of damper rod 502 can include a securement feature dimensioned for operatively connecting the damper rod on or along end member 100. As one example, damper rod 502 can include one or more helical threads disposed along end 506. Damper piston 504 can be disposed along end 508 of damper rod 502 and can be attached or otherwise connected thereto in any suitable manner. For example, the damper piston could be integrally formed with the damper rod. As another example, end 508 of damper rod 502 could include a securement feature, such as one or more helical threads, for example. In such case, damper piston 504 could be provided separately and could include a passage or hole (not numbered) into which end 508 of damper rod 502 can be secured. In a preferred arrangement, a blind passage or hole can be used to assist in maintaining fluidic isolation across damper piston 504.

In an assembled condition, damper rod assembly 500 is disposed along gas spring assembly GS1 such that damper piston 504 is received within damping chamber 418 of inner sleeve 400. In such case, damper rod 502 can extend through the passage formed by inner support wall portion 234 of end member wall 206 and such that end 506 of damper rod 502 is disposed out of damping chamber 418. In some cases, a sealing element 510 (FIG. 13) and/or a wear bushing 512 (FIG. 13) can be disposed between inner support wall portion 234 and an outer surface 514 of damper rod 502.

Additionally, it will be appreciated that damper piston 504 separates damping chamber 418 into damping chamber portions 418A and 418B disposed along opposing sides of the damper piston. In some cases, a sealing element 516 can be disposed between an outer peripheral wall 518 of damper piston 504 and inner surface 416 of sleeve wall 402. It will be recognized, however, that in some cases significant frictional forces may be generated by the sealing arrangements described above in connection with the interface between damper piston 504 and inner surface 416 as well as in connection with the interface between outer surface 514 of damper rod 502 and inner support wall portion 234. In some cases, it may be desirable to avoid or at least reduce such frictional forces (or for other reasons) by forgoing the use of sealing elements along either or both interfaces. In such cases, one or more friction reducing bushings or wear bands can, optionally, be disposed therebetween.

Furthermore, in some cases, damper rod 502 can take the form of a hollow rod that includes an inner surface 520 that can at least partially define an elongated gas damping passage 522 extending through the damper rod. In such cases, one or more passages or ports 524 can extend through the wall of the damper rod to permit fluid communication between elongated gas damping passage 522 and damping chamber portion 418A of damping chamber 418.

End mount 600 is shown in FIGS. 2, 5, 6 and 13 as including an outer support element 602 that is dimensioned for receipt and securement within the opening formed in end member 100 by mounting wall portion 110. Outer support element can include an element wall 604 with an outer peripheral surface 606 dimensioned to abuttingly engage an inner surface (not numbered) of mounting wall portion 110. In some cases, outer peripheral surface 606 of element wall 604 can include one or more engagement features, such as one or more endless annular grooves, endless annular projections and/or one or more portions of either or both thereof. In a preferred arrangement, outer support element is dimensioned for a press-fit connection with mounting wall portion 110 and engagement of the corresponding engagement features to retain the end mount on or along end member 100.

End mount 600 can also include an inner support element 608 dimensioned for securement on or along end 506 of damper rod 502. It will be appreciated that inner support element 608 can be of any suitable size, shape and/or configuration. As one example, inner support element 608 can include an element wall 610 with a connector portion 612 dimensioned for securement to the damper rod and a flange portion 612A projecting radially outward from connector portion 612. In some cases, a passage 614 can extend through element wall 610 and can be disposed in fluid communication with elongated gas damping passage 522 of damper rod 502, if provided, such that pressurized gas transfer into and out of the damping passage can be achieved.

End mount 600 can also include an elastomeric connector element 616 that is permanently attached (i.e., inseparable without damage, destruction or material alteration of at least one of the component parts) between outer and inner support elements 602 and 608. Additionally, in such a construction, elastomeric connector element 616 forms a substantially fluid-tight seal between outer and inner support elements 602 and 608. It will be appreciated that such substantially fluid-tight joints or connections can be formed by way of one or more processes and/or can include the use of one or more treatments and/or materials. Non-limiting examples of suitable processes can include molding, adhering, curing and/or vulcanizing processes.

In some cases, a sealing element 618 can be disposed between mounting wall portion 110 of end member 100 and outer support element 602. In this manner, a substantially fluid-tight construction can be formed between end member 100 and end mount 600. Additionally, in some cases, outer support element 602 can include one or more gas transfer passages 620 and/or one or more securement features 622. If provided, securement features 622 can be dimensioned to receive threaded fasteners 624, such as may be suitable for securing end member 100 and end mount 600 on or along an associated structural component (e.g., upper structural component USC in FIG. 4).

A base mount 700 can be configured to secure gas spring and gas damper assembly AS1 on or along an associated structural component, such as lower structural component LSC, for example. It will be appreciated any suitable combination of feature, elements and/or components can be used to form such a connection. As one example, the base mount can include a spherical bearing or other similar component operatively connected between the base mount and the associated structural component (e.g., lower structural component LSC). As another example, base mount 700 includes a base mount wall 702 that includes a passage (not numbered) formed therethrough generally transverse to axis AX. Base mount wall 702 can function as an outer support element and an inner support element 704 can be disposed within the passage. An elastomeric connector element 706 can be permanently attached (i.e., inseparable without damage, destruction or material alteration of at least one of the component parts) between base mount wall 702 and inner support element 706 to form an elastomeric bushing 708 suitable for pivotally mounting assembly AS1 on or along the associated structural component.

Additionally, base mount wall 702 can include one or more passages 710 formed therethrough. Passages 710 can be disposed in approximate alignment with axis AX. Additionally, in a preferred arrangement, passages 710 can be disposed in approximate alignment with securement features 226 of projections 224 on end member 200. In such case, securement devices 712 (e.g., threaded fasteners) can extend through passages 710 and into engagement with securement features 226 to attach and secure base mount 700 on or along at least one of end member 200 and inner sleeve 400. In some cases, a sealing element 714 can be disposed between base mount wall 702 and one or more of end member 200 and inner sleeve 400 such that a substantially fluid-tight connection can be formed therebetween.

In some cases, one or more jounce bumpers can be included to inhibit contact between one or more features and/or components of assembly AS1. For example, a jounce bumper 716 can be disposed within damping chamber portion 418B, such as by securement on or along damper piston 504, for example, to substantially inhibit contact between the damper piston and base mount 700 during a full jounce condition of assembly AS1. Additionally, or in the alternative, a jounce bumper 718 can be disposed within damping chamber portion 418A, such as by securement on or along end wall portion 228, for example, to substantially inhibit contact between end wall portion 228 and damper piston 504 during a full rebound condition of assembly AS1.

Figure 13:
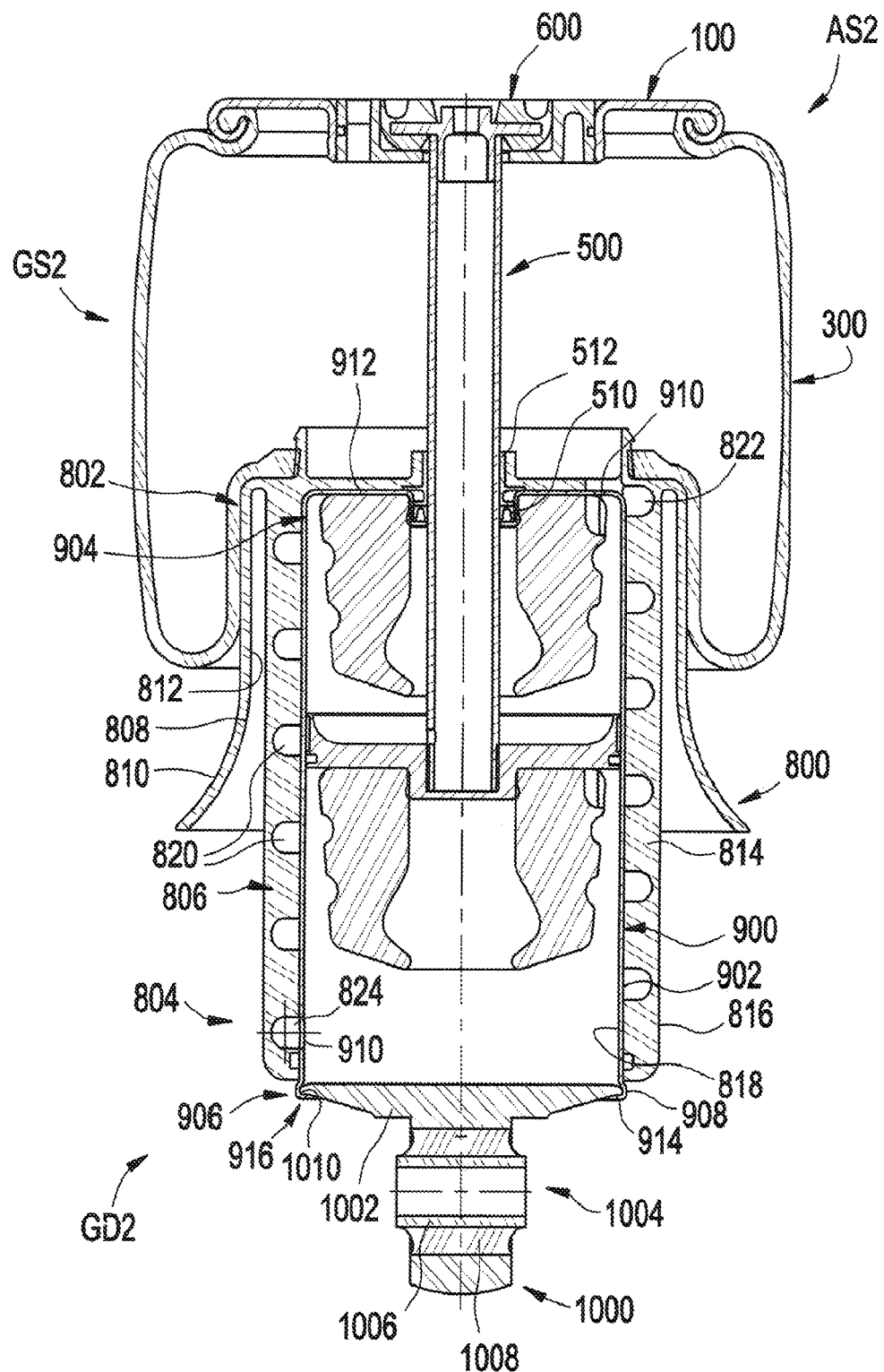
FIG. 13 is a cross-sectional side view of an alternate construction of a gas spring and gas damper assembly in accordance with the subject matter of the present disclosure.

Another example of a gas spring and gas damper assembly AS2 that may be suitable for use as one or more of gas spring and gas damper assemblies 102 in FIG. 1, for example, is shown in FIG. 13 as including a gas spring (or gas spring assembly) GS2 and a gas damper (or gas damper assembly) GD2. Assembly AS2 includes a longitudinal axis AX, such as has been described above. Gas spring GS2 includes end member 100, such as has been described above, and an end member 800 that is spaced axially from end member 100. Flexible spring member 300, such as has been described above, can extend peripherally around axis AX and can be secured between end members 100 and 800 in a substantially fluid-tight manner such that spring chamber 302 is at least partially defined therebetween.

Gas damper GD2 can include an inner sleeve 900 that is operatively supported on or along end member 800 and damper rod assembly 500, such as has been described above, that is operatively associated with inner sleeve 900. End mount 600, such as has been described above, can operatively connect damper rod assembly 500 with end member 100. A base mount 1000 can be operatively connected with one or more of end member 800 and inner sleeve 900.

End member 800 can extend lengthwise between opposing ends 802 and 804 that are axially spaced from one another. End member 800 can include an end member wall 806 that can have a first or outer side wall portion 808 that extends in a generally axial direction and includes an outside surface 810 and an inside surface 812. End member 800 can also include a second or inner side wall portion 814 that also extends in a generally axial direction. Inner side wall portion 814 is spaced radially inward from outer side wall portion 808 and includes an outside surface 816 and an inside surface 818.

One or more elongated channels can extend into inner side wall portion 812 from along inside surface 818. One way in which end member 800 differs from end member 200 described above in detail is that the channels are shown as include one or more channels 820 that extend helically around axis AX rather than extending longitudinally along the inner side wall portion of the end member wall, as in end member 200. Helical channels 820 extend between opposing end ports 822 and 824.

Inner sleeve 900 can include a sleeve wall 902 that extends axially between opposing ends 904 and 906. Sleeve wall 902 can extend peripherally about axis AX and can, in some cases, have an approximately uniform wall thickness. Additionally, sleeve wall 902 forms an outer surface 908 along the inner sleeve. In a preferred arrangement, sleeve wall 902 is dimensioned to be received within the end member cavity of end member 800 with outer surface 908 disposed in facing relation to inside surface 818 of inner side wall portion 814. In such case, a plurality of elongated gas damping passages can be formed by helical channels 820 together with outer surface 908 of the inner sleeve. In some cases, one or more orifices or ports 910 can extend through sleeve wall 902.

One way in which inner sleeve 900 differs from inner sleeve 400 described in detail above is that sleeve wall 902 include an end wall portion 912 that extends generally transverse to axis AX, and can receive and retain one or more components and/or elements, such as one or more sealing and/or bushing elements, for example. Additionally, sleeve wall 902 includes a distal end 914 that project outwardly beyond the distal edge of end member 800.

Base mount 1000 can include a base mount wall 1002 that can at least partially define an elastomeric bushing 1004 with an inner metal 1006 and an elastomeric connector element 1008. Base mount 1000 differs from base mount 700 in that base mount wall 1002 includes an outer peripheral edge 1010 dimensioned for receipt within distal end 914 of sleeve wall 902. A crimped connection 916 can be formed by distal end 914 of sleeve wall 902 around outer peripheral edge 1010 of base mount wall 1002 to secure the base mount on or along inner sleeve 900 and form a substantially fluid-tight seal therewith.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and gas damper assembly comprising:
    a gas spring including:
        a flexible spring member having a longitudinal axis and including a flexible wall extending longitudinally between first and second ends and peripherally about said axis to at least partially define a spring chamber;
        a first end member secured across said first end of said flexible spring member such that a substantially fluid-tight seal is formed therebetween; and,
        a second end member disposed in spaced relation to said first end member and secured across said second end of said flexible spring member such that a substantially fluid-tight seal is formed therebetween, said second end member including an end member wall having an outside surface dimensioned for abutting engagement with said flexible wall of said flexible spring member and an inside surface at least partially defining an end member cavity; and,
    a gas damper including:
        an inner sleeve extending longitudinally between opposing sleeve ends, said inner sleeve including a sleeve wall with an inner surface and an outer surface, said inner sleeve at least partially received within said end member cavity such that said outer surface of said sleeve wall is disposed in facing relation to said inside surface of said end member wall, said inner surface of said sleeve wall at least partially defining a damping chamber; and,
        a damper piston assembly including a damper piston and an elongated damper rod operatively connected to said damper piston, said damper piston positioned within said damping chamber and including an outer side wall disposed adjacent said inner surface of said inner sleeve, said damper piston separating said damping chamber into first and second chamber portions with at least one of said first and second chamber portions disposed in fluid communication with said spring chamber through an elongated damping passage that is capable of providing pressurized gas damping, said damper rod including a damper rod wall with an outer surface and an inner surface with said inner surface extending lengthwise through said damper rod and at least partially defining said elongated damping passage, said damper rod including a damper rod orifice extending through said damper rod wall in fluid communication between said elongated damping passage and said at least one of said first and second chamber portions;
        said damper rod operatively connected to said first end member such that upon extension and compression of said gas spring and gas damper assembly, said damper piston is reciprocally displaced within said damping chamber.

2. A gas spring and gas damper assembly according to claim 1, wherein said first chamber portion is disposed in fluid communication with an associated pressurized gas source through said first elongated damping passage.

3. A gas spring and gas damper assembly according to claim 1, wherein said end member wall includes an end wall portion with an orifice extending therethrough, and said first chamber portion is disposed in fluid communication with said spring chamber through said orifice in said end wall portion.

4. A gas spring and gas damper assembly according to claim 3 further comprising a control device disposed in fluid communication with said orifice and operative to selectively control pressurized gas transfer through said orifice in at least one direction.

5. A gas spring and gas damper assembly according to claim 1, wherein said first end member includes an end member wall with a mounting passage extending therethrough, and said gas damper including an end mount received within said mounting passage and operatively connecting said elongated damper rod of said damper piston assembly to said first end member.

6. A gas spring and gas damper assembly according to claim 5, wherein said end member wall of said first end member includes a gas transfer passage extending therethrough in fluid communication with said spring chamber.

7. A gas spring and gas damper assembly according to claim 5, wherein said end mount includes an outer support element operatively secured to said end member wall of said first end member, an inner support element operatively connected to said elongated damper rod of said damper piston assembly, and an elastomeric connector element disposed between said outer support element and said inner support element.

8. A suspension system comprising:
a pressurized gas system including a pressurized gas source and a control device; and,
at least one gas spring and gas damper assembly according to claim 1 disposed in fluid communication with said pressurized gas source through said control device such that pressurized gas can be selectively transferred into and out of at least said spring chamber.

9. A gas spring and gas damper assembly comprising:
a gas spring including:
a flexible spring member having a longitudinal axis and including a flexible wall extending longitudinally between first and second ends and peripherally about said axis to at least partially define a spring chamber;
a first end member secured across said first end of said flexible spring member such that a substantially fluid-tight seal is formed therebetween; and,
a second end member disposed in spaced relation to said first end member and secured across said second end of said flexible spring member such that a substantially fluid-tight seal is formed therebetween, said second end member including an end member wall having an outside surface dimensioned for abutting engagement with said flexible wall of said flexible spring member and an inside surface at least partially defining an end member cavity; and, a gas damper including:
an inner sleeve extending longitudinally between opposing sleeve ends, said inner sleeve including a sleeve wall with an inner surface and an outer surface, said inner sleeve at least partially received within said end member cavity such that said outer surface of said sleeve wall is disposed in facing relation to said inside surface of said end member wall, said inner surface of said sleeve wall at least partially defining a damping chamber; and,
a damper piston assembly including a damper piston and an elongated damper rod operatively connected to said damper piston, said damper piston positioned within said damping chamber and including an outer side wall disposed adjacent said inner surface of said inner sleeve, said damper piston separating said piston chamber into first and second chamber portions with at least one of said end member wall and said inner sleeve at least partially defining an elongated damping passage extending helically about said longitudinal axis in fluid communication between said spring chamber and one of said first and second chamber portions;
said damper rod operatively connected to said first end member such that upon extension and compression of said gas spring and gas damper assembly, said damper piston is reciprocally displaced within said damping chamber.

10. A gas spring and gas damper assembly according to claim 9, wherein at least one of said sleeve ends forms an open end of said damping chamber, and said gas damper includes a base mount secured across said open end such that a substantially fluid-tight seal is formed with at least one of said inner sleeve and said end member wall of said second end member.

11. A gas spring and gas damper assembly according to claim 10, wherein said base mount includes an elastomeric bushing dimensioned to permit pivotal movement of said gas spring assembly relative to an associated structural component.

12. A gas spring and gas damper assembly according to claim 10, wherein said base mount is secured to said second end member using a plurality of fasteners.

13. A gas spring and gas damper assembly according to claim 10, wherein said base mount is secured to said sleeve wall of said inner sleeve using one of a crimped connection and a flowed-material joint.

14. A gas spring and gas damper assembly according to claim 10, wherein said gas damper includes at least one sealing element disposed between said base mount and at least one of said inner sleeve and said second end member.

15. A gas spring and gas damper assembly according to claim 9, wherein said end member wall of said second end member includes an outer wall portion and an inner wall portion that is spaced radially inward from said outer wall portion with said outer wall portion including said outside surface disposed in abutting engagement with said flexible wall and said inner wall portion including said inside surface disposed in facing relation with said inner sleeve.

16. A gas spring and gas damper assembly according to claim 9, wherein said end member wall of said second end member includes an end wall portion extending transverse to said longitudinal axis and at least partially forming a closed end of said damping chamber.

17. A gas spring and gas damper assembly according to claim 16, wherein said end wall portion includes a passage extending therethrough, and said elongated damping rod of said damper piston assembly extends out of said damping chamber through said passage and into said spring chamber.

18. A gas spring and gas damper assembly according to claim 9, wherein one of said spring chamber and said first chamber portion is disposed in fluid communication with an associated pressurized gas source.

19. A gas spring and gas damper assembly according to claim 9, wherein said end member wall includes an end wall portion with an orifice extending therethrough, and said first chamber portion is disposed in fluid communication with said spring chamber through said orifice in said end wall portion.

20. A gas spring and gas damper assembly according to claim 19 further comprising a control device disposed in fluid communication with said orifice and operative to selectively control pressurized gas transfer through said orifice in at least one direction.

\* \* \* \* \*